United States Patent [19]

Dicke et al.

[11] Patent Number: 4,954,008
[45] Date of Patent: Sep. 4, 1990

[54] QUICK RELEASE MECHANISM AND SUPPORTING DEVICE HAVING A QUICK RELEASE MECHANISM

[76] Inventors: Grant D. Dicke, 1130 Franklin St., Downers Grove, Ill. 60515; Jeffrey A. Williams, 610 Preston St., Bolingbrook, Ill. 60439

[21] Appl. No.: 261,707

[22] Filed: Oct. 24, 1988

[51] Int. Cl.⁵ .............................................. F16B 1/00
[52] U.S. Cl. ........................................ 403/24; 403/95; 403/327; 403/330
[58] Field of Search ..................... 403/95, 96, 92, 324, 403/325, 330, 327, 24; 74/551.4

[56] References Cited

U.S. PATENT DOCUMENTS

| | | | |
|---|---|---|---|
| 601,613 | 3/1898 | Castle | 74/551.4 |
| 691,050 | 1/1902 | Dronne | 403/327 |
| 3,608,935 | 9/1971 | Hodapp, Jr. | 403/325 X |

FOREIGN PATENT DOCUMENTS 423205  4/1911  France .................................. 403/96

Primary Examiner—Andrew V. Kundrat
Attorney, Agent, or Firm—Keil & Weinkauf

[57] ABSTRACT

A quick release mechanism for locking a tubular leg member to a supporting structure whereby a >-shaped flat metal spring exerts upward pressure on the handle end of a lever arm causing the lower operating end of the lever arm to force a locking pin into the locked position in the supporting structure. The pin is unlocked by pressing down on the handle end of the lever arm. The quick release mechanism may be secured to legs of a supporting device so that the legs can be readily pivoted into a number of positions, particularly an extended position for support and a spaced parallel arrangement for storage.

21 Claims, 1 Drawing Sheet

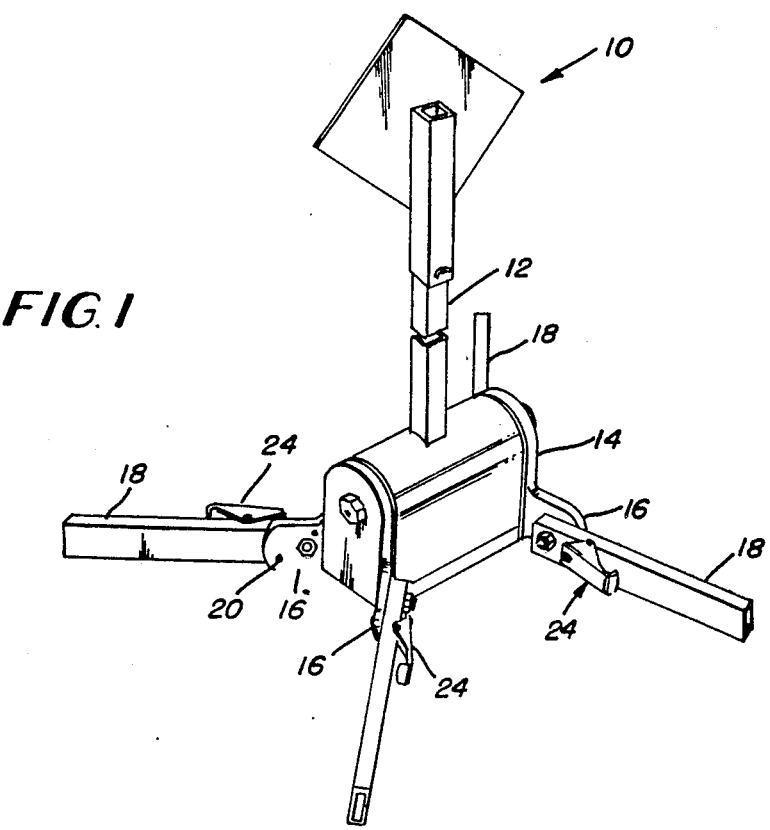
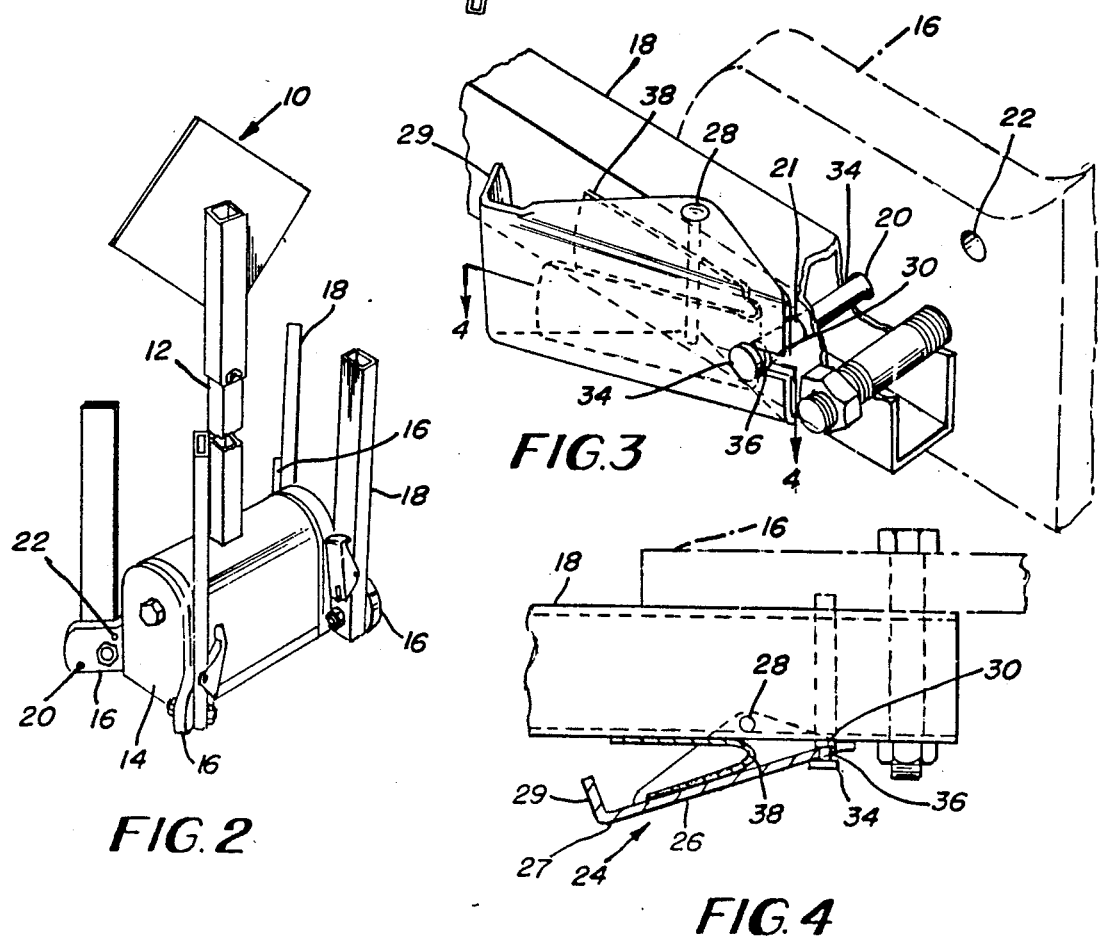

QUICK RELEASE MECHANISM AND SUPPORTING DEVICE HAVING A QUICK RELEASE MECHANISM

BACKGROUND OF THE INVENTION

This invention relates to a quick release mechanism for pivotally joined tube members and more particularly for use on foldable legs attached to supporting structures for outdoor signs or barriers.

There are a number of occasions when it is desired to releasably attach a tube or the like to a structure. For example, a number of tubular legs are required for the mounting base for outdoor signs and barriers which provide information and limitations. This is particularly so along vehicle roadways and pedestrian pathways where there is a need to inform the public of some road construction or limitation. Frequently, the need is temporary and thus it is very advantageous to have mounting bases for such signs and barriers which may be readily assembled and disassembled with very little effort on the part of the worker.

Some mounting bases have multiple leg flanges or the like, usually four, extending from the lower frames and an equal number of foldable and extendable legs pivotally mounted thereto. The legs, when locked to the flanges in a horizontal position, support the sign in the work area. In order to obtain a compact structure which takes up less room when the mounting base is not in use, the pivotally mounted legs are quite often folded upwards and temporarily attached in a vertical position to the flanges.

Heretofore, such attachments have been accomplished by removable pins, bolts, clips or by being manually tied-upright.

A frequently used attachment has been a pin assembly. The pin is attached to a coil spring within the tube leg. This requires drilling holes in the pin, inserting small needles therein and attaching the coil spring thereto. To lock the leg to the flange, an opening in the leg is aligned with openings in the flange and the pin is forced inwardly through the openings into the engaged position. The pin is unlocked by pulling it out of the opening.

However, the constructions most frequently used have not been satisfactory. They are often awkward and time consuming operations. They require a great deal of effort on the part of the worker. In many cases to release the pin from the locked position, the worker must remove his gloves and use both hands in order to unlock the system. In most cases the worker has to bend over to perform the unlocking. There are also complicated coil spring-pin attachments that are difficult to manufacture and to operate.

There is a need for a simple quick release mechanism which securely locks and readily unlocks tubular members with very little effort on the part of the worker.

SUMMARY OF THE INVENTION

In accordance with the present invention, a quick release mechanism is provided which solves the problems of the prior art.

The quick release mechanism of the present invention is mounted on a tubular member, for example, the tubular legs of a mounting base for outdoor signs and barriers. The quick release mechanism includes a lever arm, a pin and a resilient member. The lever arm is pivotally attached to the tubular leg. The pin passes through and extends beyond both sides of the tubular leg and loosely rides within a slot at the operating end of the lever arm. The resilient means fits beneath the handle end of the lever arm being in tensional contact with the outer surface of the leg and the bottom surface of the lever arm.

To lock the leg in any position, such as in either the horizontal support position or in the upright compact position, the pin is pushed inwardly to an engaged position in the leg flange by the operating end of the lever arm. The pin is unlocked by pressing on the handle end of the lever arm which pulls the pin out of the engaged position in the leg flange.

The resilient means is designed to be always in tension. It puts upward pressure on the under side of said handle end of the lever arm in order to keep the operating end of the lever arm in the downward position forcing the pin in the engaged locked position.

The resilient means preferably includes a piece of metal, plastic or rubber or similar material preferably shaped which is fitted beneath said handle end of the lever arm in tensional contact with the inner surface of said handle end of the lever and the outer surface of the tubular leg.

Accordingly, it is an object of the present invention to provide a quick release mechanism which securely locks and readily unlocks tube members to and from a structure.

It is a further object to provide a quick release mechanism which can be easily and quickly operated with little effort on the part of the worker.

It is another object to provide a quick release mechanism which can lock and unlock members in horizontal and upright positions.

It is another further object to provide a quick release mechanism which is a simple structure containing few parts which is easy to manufacture and assemble.

BRIEF DESCRIPTION OF THE DRAWINGS

FIG. 1 is a perspective view of a typical road construction sign with the four legs extended for support.

FIG. 2 is a perspective view of the sign with the legs in the vertical folded position for storage or transporting.

FIG. 3 is a partial perspective view of the latching or release mechanism in the locked-in position. The spring may be seen in dotted line.

FIG. 4 a horizontal section taken along line 4—4 of FIG. 3 showing the spring encapsulated between the channel member and the finger operated latch.

DESCRIPTION OF THE PREFERRED EMBODIMENT

A preferred embodiment of the quick release mechanism of the present invention is illustrated in the drawings of a mounting base for a highway sign requiring supporting leg members.

Referring to FIG. 1, sign 10 is attached to a mast 12 which is supported vertically upon a mounting base 14. The mounting base generally has four leg flanges 16 and an equal number of tubular legs 18 pivotally attached thereto. Although tubular legs 18 as shown are rectangular, it is not to be so limited. Any tubular configuration is operable such as circular, square, etc.

FIG. 1 shows the sign structure being supported while in use in the work area. Generally, each leg flange 16 includes two openings such as openings 20 and 22 which, as shown, completely penetrate the leg flange but are not required to do so. Only enough opening to lock the pin in place is required.

Legs 18 support the structure in use by being locked in an horizontal extended position by means of a pin passing through opening 21 of the leg into opening 20 of the flange (FIGS. 1 and 3). FIG. 2 shows the sign structure with the legs locked in the upright compact position by means of the pin passing through opening 21 of the leg into opening 22 of the leg flange (FIG. 3).

The construction and operation of the quick release mechanism are best understood by reference to FIGS. 3 and 4. Quick release mechanism 24 includes three components: a lever arm 26, a pin 34 and a resilient member such as a flat metal spring 38. The lever arm 26 is attached to the tubular leg 18 by hinge 28 or similar means which allows the lever arm to pivot. Pin 34 extends through both sides of leg 18 and may penetrate openings 20 or 22. A first end of pin 34 fits within slot 30 of lever arm 26. The lever arm 26 loosely engages the pin 34 within groove 36.

Groove 36 generally is located just below the first end of the pin. The groove has a smaller diameter than the rest of the pin and is cut to such dimensions so that it rides freely within slot 32 in an up and down movement. The second or locking end of pin 34 is forced into opening 20 or 22 of the leg flange when tubular leg 18 is in the locked position.

The resilient means is located beneath the handle end 27 of lever arm 26 to force that end of the lever arm 26 to an upright position at an angle of about 30° from the horizontal tubular leg when in the locked position. The resilient means is preferably a >-shaped piece of flat metal spring 38 which snugly fits between the handle end of the lever arm 26 and the tubular leg 18. Apron wall 29 of the lever arm 26, when in the locked position, extends downwardly about 40% of the distance to the tubular leg and prevents the flat metal spring 38 from slipping out of position. Apron wall 29 also limits the movement of lever arm 26 and pin 34 by acting as a stop to the downward movement of the lever arm.

It is to be understood that flat metal spring 38 of the preferred embodiment is of the type formed of flat spring steel having a high degree of memory, high tensile strength and high yield point. A triangular piece of stainless steel is the preferred material.

The >-shaped flat metal spring 38 is designed to be in constant tensional contact with the lever arm and the tubular leg. In the locked position, it exerts upward force on the lever arm's handle end 27 thus moving the lever arm's operating end downwardly towards the leg surface to force pin 34 into a locked position.

Pin 34 is disengaged from the locked position by exerting downward pressure on the handle end 27 of the arm, resulting in the grooved pin being lifted out of opening 20 or 22 to the unlocked position. The leg is then moved to the desired position.

There are several advantages to the quick release mechanism. Only three components are required: lever arm 26, pin 34 and triangular flat metal spring 38. The components can be easily manufactured. They can be readily assembled into a simple mechanism which is easily attached to a tubular structure.

Further advantages are that the unique assembly of these components results in an unexpectedly smoothly operated mechanism with very little effort on the part of the worker. Pin 34 is made to smoothly fit in the openings 20 and 22 of the leg flange. Groove 38 of the pin and slot 30 of the operating end of the lever arm are cut to such dimensions so that the grooved pin rides loosely in up and down movements within the slot 30. Flat metal spring 38 is prepared from material having such dimensions and >-shaped designs to fit snugly beneath handle end 27 of the lever arm to keep constant upward pressure therein yet readily yields to downward pressure applied to the handle and to release the pin from the locked position. Apron wall 29 extends downwardly a sufficient distance to contain the flat metal spring in its operating position and to control the downward movement of the handle end and the upward movement of the operating end of the lever arm. Hinge 28 is set closer to the operating end of the lever arm, about 40% of the distance from end to end, to coordinate the functioning of all of the elements of the quick release mechanism.

Further, it will be apparent to those skilled in the art from the foregoing description and accompanying drawings that additional modifications and/or changes of the disclosed embodiment may be made without departure from the invention. Accordingly, it is expressly intended that the foregoing description and accompanying drawings are illustrative of a preferred embodiment only, not limiting, and that the true spirit and scope of the present invention be determined by reference to the appended claims.

What is claimed is:

1. A quick release mechanism that secures a member to a structure, the mechanism comprising:
   (a) a pin which slidably resides in an opening in the member;
   (b) a lever arm attached to the member in a pivotable fashion, the lever arm having a handle end and an operating end, the operating end engaging a first end of the pin, the handle end having an apron wall that extends angularly towards the member to such a degree that the apron wall acts as a stop to the pivotable movement of the lever arm so that the movement of the pin out of the opening is limited; and
   (c) a resilient means for forcing a second end of the pin into an opening in the structure, the resilient means being in a location that permits a force to be exerted on the underside of the lever arm's handle end.

2. The quick release mechanism of claim 1, wherein the lever arm is attached to the member by means of a hinge placed about 40% of the distance from the lever arm's operating end to an opposing end of the handle end.

3. The quick release mechanism of claim 1, wherein the resilient means is a >-shaped metal piece having tails in tensional contact with the underside of the lever arm and the surface of the member.

4. The quick release mechanism of claim 3, wherein the resilient means is a >-shaped flat stainless steel spring.

5. The quick release mechanism of claim 3, wherein the member is hollow.

6. The quick release mechanism of claim 5, wherein the resilient means is a >-shaped metal piece that is prevented from slipping out of position by the apron wall.

7. A foldable supporting device, comprising:
   (a) a central base;
   (b) a plurality of pivotable legs that are attached to the central base, the legs being able to pivot into a supporting position and into a spaced parallel noncoaxial arrangement where each leg in the spaced parallel noncoaxial arrangement extends from the central base in substantially the same direction; and (c) a plurality of means for securing the pivotable legs to the central base, wherein at least one means for securing the pivotable legs is attached to an individual leg and can secure that leg in at least two positions, and wherein an individual means for securing the pivotable legs to the central base comprises:

(i) a pin which passes through an opening in the leg, the pin having first and second ends;

(ii) a lever arm attached to the leg and being able to pivot about an axis, the lever arm having a handle end and an operating end, wherein the operating end is attached to the first end of the pin; and (iii) a resilient means for forcing the lever arm's operating end towards the leg so that the second end of the pin can be forced into an opening in the central base.

8. The foldable supporting device of claim 7, wherein the resilient means is a spring placed between the lever arm's handle end and the respective leg so as to exert an upward force on the underside of the levers arm's handle end.

9. The foldable supporting device of claim 8, wherein the leg is hollow and each means for securing each leg has a means for controlling the movement of the lever arm so that when the lever arm's handle end is pushed towards the leg, the lever arm's operating end has a limited upward movement.

10. The foldable supporting device of claim 8, wherein the lever arm is attached to the leg by means of a hinge having an axis placed about 40% of the distance from the lever arm's operating end to an opposing end of the handle end.

11. The foldable supporting device of claim 9, wherein means for holding the resilient means and means for controlling the movement of the lever arm include an apron wall placed at the lever arm's handle end.

12. A foldable sign supporting device, comprising:
(a) a mounting base;
(b) a means for supporting a sign, the supporting means being attached to the mounting base;
(c) a plurality of pivotable legs that will support the mounting base when the sign supporting device is in use, each leg being attached to the mounting base; and (d) a plurality of means for securing the pivotable legs to the mounting base, wherein at least one means for securing the pivotable legs is attached to an individual pivotable leg and can secure that leg in at least two positions, and wherein an individual means for securing the pivotable legs to the central base comprises:

(i) a pin which passes through an opening in the leg, the pin having first and second ends;

(ii) a lever arm attached to the leg and being able to pivot about an axis, the lever arm having a handle end and an operating end, wherein the operating end is attached to the first end of the pin; and (iii) a resilient means for forcing the lever arm's operating end towards the leg so that the second end of the pin can be forced into an opening in the mounting base.

13. The foldable sign supporting device of claim 12, wherein the mounting base has a plurality of leg flanges, each leg flange having at least two openings for receiving the second end of the pin.

14. The foldable sign supporting device of claim 13, wherein the resilient means is a spring placed between the lever arm's handle end and the respective leg.

15. The foldable sign supporting device of claim 12, wherein the resilient means for forcing the lever arm's operating end towards the leg exerts a force on the underside of the lever arm's handle end.

16. The foldable sign supporting device of claim 15, wherein the spring is >-shaped.

17. The foldable sign supporting structure of claim 16, wherein the lever arm has an apron wall at the handle end.

18. The foldable sign supporting device of claim 12, wherein each leg is a hollow member and each means for securing each leg to the mounting base has a means for controlling the movement of the lever arm so that when the lever arm's handle end is pushed toward the member, the lever arm's operating end has a limited upward movement.

19. The foldable sign supporting device of claim 18, wherein the lever arm has an apron wall.

20. The sign supporting device of claim 12, wherein the lever arm of an individual means for securing an individual pivotable leg to the mounting base is attached to the leg by a hinge having an axis placed about 40% of the distance from the lever arm's operating end to an opposing end of the handle.

21. The sign support device of claim 7, wherein the legs are able to pivot into a spaced parallel arrangement when the foldable sign supporting device is not in use.

* * * * *

UNITED STATES PATENT AND TRADEMARK OFFICE
CERTIFICATE OF CORRECTION

PATENT NO. : 4,954,008
DATED : September 4, 1990
INVENTOR(S) : Grant DICKE et al.

It is certified that error appears in the above-identified patent and that said Letters Patent is hereby corrected as shown below:

Claim 3, line 4: delete ","

Claim 21, line 1: "7" should read --12--

Signed and Sealed this

Eighteenth Day of February, 1992

Attest:

HARRY F. MANBECK, JR.

Attesting Officer     Commissioner of Patents and Trademarks